US009595836B2

(12) United States Patent
Wang et al.

(10) Patent No.: US 9,595,836 B2
(45) Date of Patent: Mar. 14, 2017

(54) POWER TRANSFER CIRCUIT FOR ACHIEVING POWER TRANSFER BETWEEN STACKED RECHARGEABLE BATTERY CELLS

(71) Applicant: HYCON TECHNOLOGY CORP., Taipei (TW)

(72) Inventors: Chuan Sheng Wang, Taipei (TW); Po Yin Chao, Taipei (TW); Jui Chien Liu, Taipei (TW)

(73) Assignee: Hycon Technology Corp., Taipei (TW)

( * ) Notice: Subject to any disclaimer, the term of this patent is extended or adjusted under 35 U.S.C. 154(b) by 0 days.

(21) Appl. No.: 15/044,505

(22) Filed: Feb. 16, 2016

(65) Prior Publication Data

US 2016/0164314 A1 Jun. 9, 2016

Related U.S. Application Data

(62) Division of application No. 14/171,876, filed on Feb. 4, 2014.

(51) Int. Cl.
*H02J 7/14* (2006.01)
*H02J 7/00* (2006.01)

(52) U.S. Cl.
CPC ............ *H02J 7/0019* (2013.01); *H02J 7/007* (2013.01); *H02J 7/0016* (2013.01); *H02J 7/0054* (2013.01)

(58) Field of Classification Search
USPC .......................... 320/104, 108, 118, 116, 134
See application file for complete search history.

(56) References Cited

U.S. PATENT DOCUMENTS

| | | | | |
|---|---|---|---|---|
| 2009/0278496 | A1* | 11/2009 | Nakao | H02J 7/0016 320/118 |
| 2009/0315515 | A1* | 12/2009 | Yu | H02J 7/0016 320/116 |
| 2013/0059220 | A1* | 3/2013 | Kim | H01M 8/04947 429/431 |
| 2013/0113432 | A1* | 5/2013 | Suzuki | H02J 7/0014 320/134 |
| 2013/0342156 | A1* | 12/2013 | Nakao | H02J 7/0016 320/104 |

* cited by examiner

*Primary Examiner* — Brian Ngo
(74) *Attorney, Agent, or Firm* — Che-Yang Chen; Law Offices of Scott Warmuth

(57) ABSTRACT

A power transfer circuit for achieving power transfer between stacked rechargeable battery cells is disclosed. The power transfer circuit includes an inductor, a first switch, a second switch and a controller. A loop of the rechargeable battery cell having higher power and the inductor is conducted so that the inductor stores power until the current flowing through the inductor meets the cutoff amount. Then, a loop of the rechargeable battery cell having lower power and the inductor is conducted so that the inductor releases the power saved in the inductor to the rechargeable battery cell having lower power until current flowing through the inductor changes direction. Therefore, balance between the rechargeable battery cells can be achieved.

12 Claims, 7 Drawing Sheets

POWER TRANSFER CIRCUIT FOR ACHIEVING POWER TRANSFER BETWEEN STACKED RECHARGEABLE BATTERY CELLS

FIELD OF THE INVENTION

The present invention relates to a power transfer circuit. More particularly, the present invention relates to a power transfer circuit for power transfer between stacked rechargeable battery cells.

BACKGROUND OF THE INVENTION

Rechargeable batteries are widely used in many products, such as notebooks, tablets, mobile phones, and even large electric vehicles. Generally, rechargeable batteries are composed of a number of rechargeable battery cells linked in series or parallel with the same spec to fulfill a certain power supply. Although every rechargeable battery cell may have the same source, due to very small difference in materials and manufacturing among rechargeable battery cells, it leads to unbalance situation among rechargeable battery cells when they are working (charging or discharging). The unbalance situation of the rechargeable battery cells may further cause low power of the rechargeable battery cells easily, even the rechargeable battery cells would reduce their lives due to over-charge. To settle the problem of unbalance of rechargeable battery cell is an important issue during development of each rechargeable battery cell.

In order to settle the problem mentioned above, many prior arts provide balance circuit so as to dynamically balance power of two adjacent rechargeable battery cells. A commonly used method is shown in FIG. 1. A conventional balance circuit 10 for multi-battery cells is shown. The balance circuit 10 includes several battery cells (a battery cell 101, a battery cell 102 and a battery cell 103) linked in series and a controller 100. An anode of the battery cell 102 is coupled to a port 122 of the controller 100 via a resistor 112. A cathode of the battery cell 102 is coupled to a port 121 of the controller 100 via a resistor 111. In the controller 100, an internal distribution path 132 and the battery cell 102 are linked in parallel. The internal distribution path 132 is connected to an internal distribution control switch 142. A controller 100 controls the internal distribution control switch 142 via a control signal D2.

An anode of the battery cell 101 is coupled to a port 121 of the controller 100 via a resistor 111. A cathode of the battery cell 101 is coupled to a port 120 of the controller 100 via a resistor 100. In the controller 100, an internal distribution path 131 and the battery cell 101 are linked in parallel. The internal distribution path 131 is linked to an internal distribution control switch 141. The controller 100 controls the internal distribution control switch 141 via a control signal D1. An anode of the battery cell 103 is coupled to a port 123 of the controller 100 via a resistor 113. A cathode of the battery cell 103 is coupled to a port 122 of the controller 100 via a resistor 112. In the controller 100, an internal distribution path 133 and the battery cell 103 are linked in parallel. The internal distribution path 133 is linked to an internal distribution control switch 143. The controller 100 controls the internal distribution control switch 143 via a control signal D3.

When unbalance situation happens among battery cells, for example, when voltage of the battery cell 102 is higher than that of other battery cells, the controller 100 conducts the internal distribution control switch 142 so that a distribution current (not shown) flow into the internal distribution path 132 and cause charging speed of the battery cell 102 slow down. Voltages of each battery cells come to balance.

However, a defect of the method is that heat will come out in the distribution circuits and accommodate in the controller 100. It may damage the controller 100. Meanwhile, in order to balance battery cells, power in the battery cell having higher voltage us consumed. Performance of the battery is reduced.

Therefore, effective control method and power transfer circuit for transferring power between stacked rechargeable battery cells are still desired.

SUMMARY OF THE INVENTION

The known balance circuit for rechargeable battery cells has defects of generating heat and extra consuming power. Therefore, a power transfer circuit is required to control every rechargeable battery cells under different operations for efficiently balancing rechargeable battery cells without large power consumption of the rechargeable battery cells. The control method and power transfer circuit according the present invention can fulfill the aforementioned requirement.

According to an aspect of the present invention, a power transfer circuit for achieving power transfer between stacked rechargeable battery cells includes: an inductor respectively linked to two stacked rechargeable battery cells in parallel but not electrically conducted where the two stacked rechargeable battery cells are connected in series, for storing power and releasing stored power, wherein an anode of one rechargeable battery cell is electrically connected to a cathode of the other rechargeable battery cell directly or indirectly so that a loop is formed; a first switch, connected to the inductor and one of the two rechargeable battery cells, for conducting a loop linking of the inductor and the rechargeable battery cell connected thereto after receiving a conducting signal; a second switch, connected to the inductor and the other of the two rechargeable battery cells, for conducting a loop linking of the inductor and the rechargeable battery cell connected thereto after receiving a conducting signal; and a controller, including: a first comparator, connected to a first end and a second end of the first switch, for detecting voltage difference across the first switch; a second comparator, connected to a third end and a fourth end of the second switch, for detecting voltage difference across the second switch; a first signal source for sending the conducting signal to the first switch; a second signal source for sending the conducting signal to the second switch.

Preferably, a cutoff amount for current flowing through the inductor is preset, when the rechargeable battery cell connected to the first switch has higher power, the first signal source sends the conducting signal to the first switch so that the first switch turns on and the inductor stores power until the current flowing through the inductor meets the cutoff amount, and then the second comparator detects voltage difference between two ends of the second switch and sends the conducting signal to the second switch so that the second switch turns on and the inductor releases stored power to the rechargeable battery cell having lower power until direction of the current flowing through the inductor changes.

Preferably, a cutoff amount for current flowing through the inductor is preset, when the rechargeable battery cell connected to the second switch has higher power, the second signal source sends the conducting signal to the second switch so that the second switch turns on and the inductor stores power until the current flowing through the inductor meets the cutoff amount, and then the first comparator detects voltage difference between two ends of the first switch and sends the conducting signal to the first switch so that the first switch turns on and the inductor releases stored power to the rechargeable battery cell having lower power until direction of the current flowing through the inductor changes.

Preferably, the first switch is an N-channel Metal-Oxide-Semiconductor Field-Effect Transistor (MOSFET) or a P-channel MOSFET.

Preferably, the second switch an N-channel MOSFET or a P-channel MOSFET.

Preferably, the rechargeable battery cell having higher state of charge has higher power.

Preferably, when the current flowing through the inductor changes direction, voltage difference between two ends of the switch connected to the rechargeable battery having lower power is 0.

Preferably, when a difference between values of state of charge of the two rechargeable battery cells is smaller than a minimum difference, the first switch and the second switch both turns off.

The control method and power transfer circuit according the present invention can utilize an inductor to buffer power from the rechargeable battery cell which has more power and compensate the other rechargeable battery cell which has less power. Balance between rechargeable battery cells can be achieved and no unnecessary power is consumed.

DETAILED DESCRIPTION OF THE PREFERRED EMBODIMENT

The present invention will now be described more specifically with reference to the following embodiment.

Figure 1:
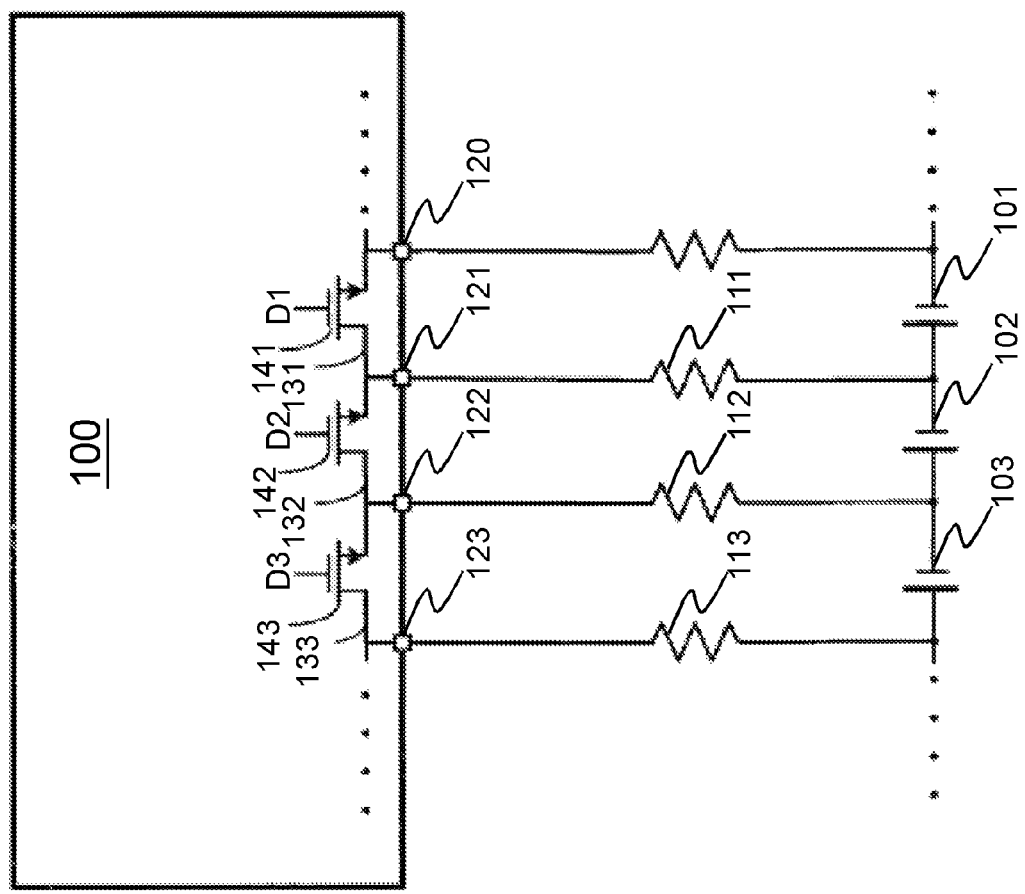
FIG. 1 is a block diagram of a prior art of a balance circuit for multi-battery cells.
Figure 2:
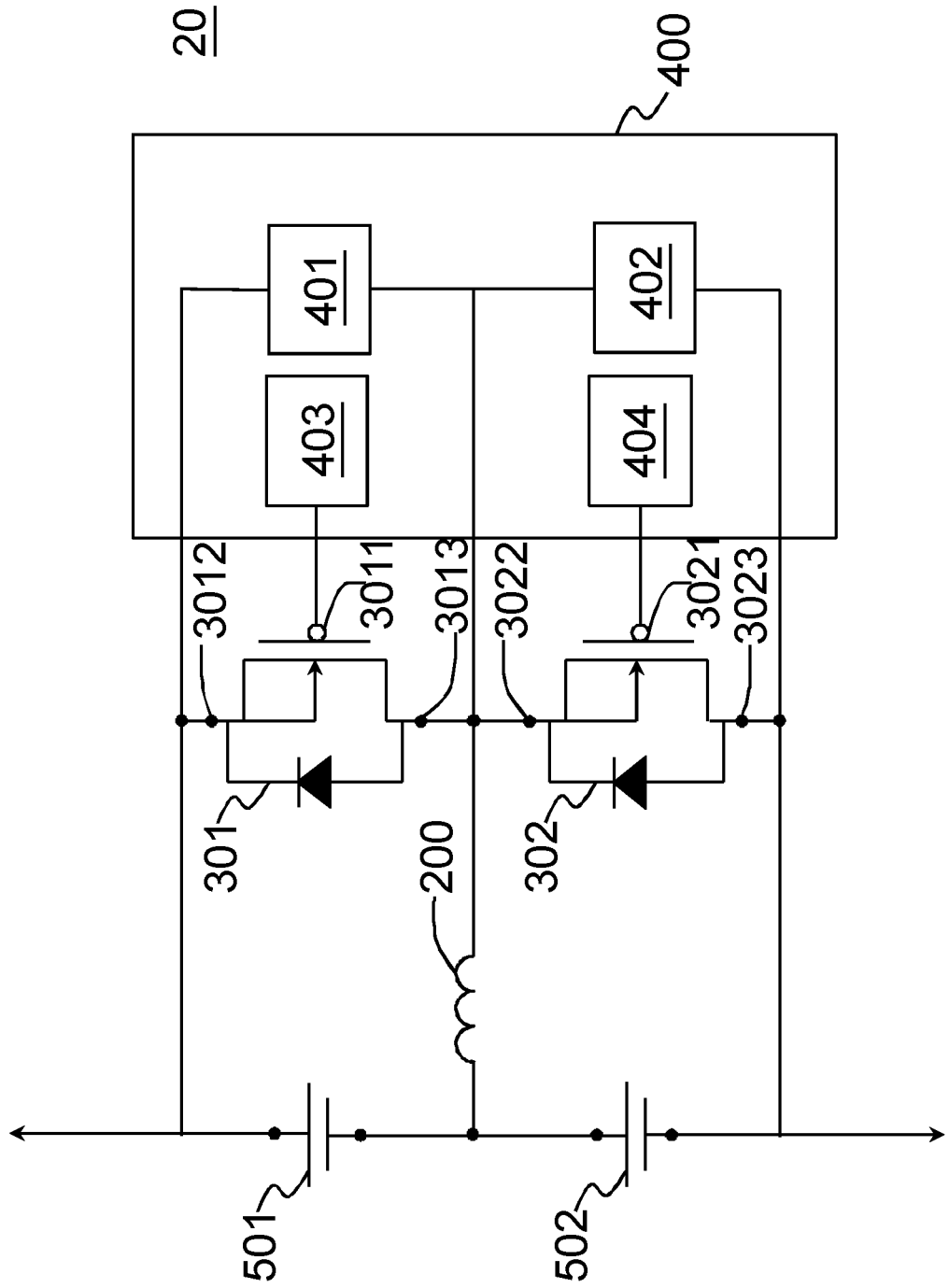
FIG. 2 is a block diagram of a power transfer circuit according to the present invention.
Figure 3:
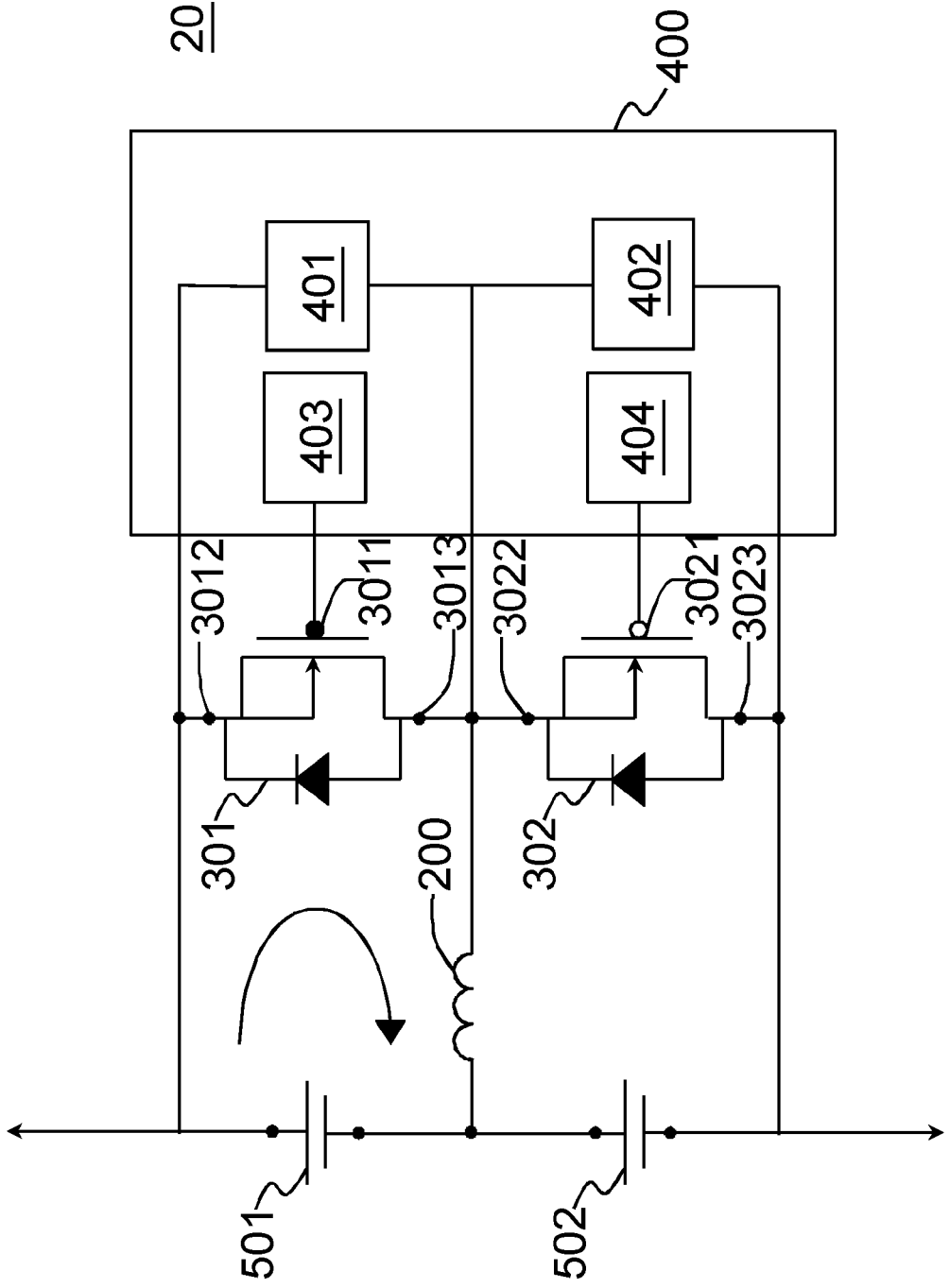
FIG. 3 illustrates an inductor in the power transfer circuit stores power.
Figure 4:
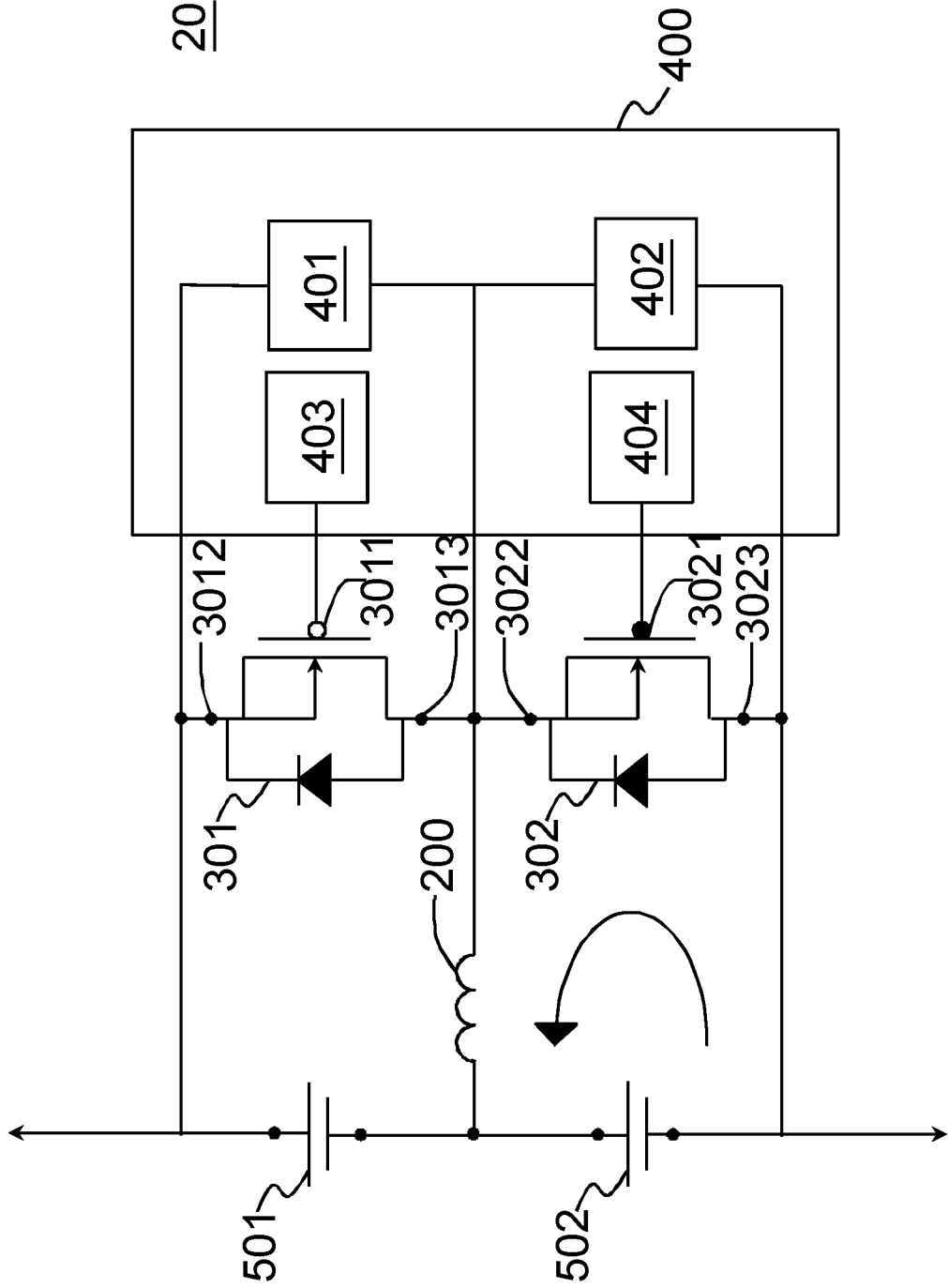
FIG. 4 illustrates the inductor in the power transfer circuit releases stored power.
Figure 5:
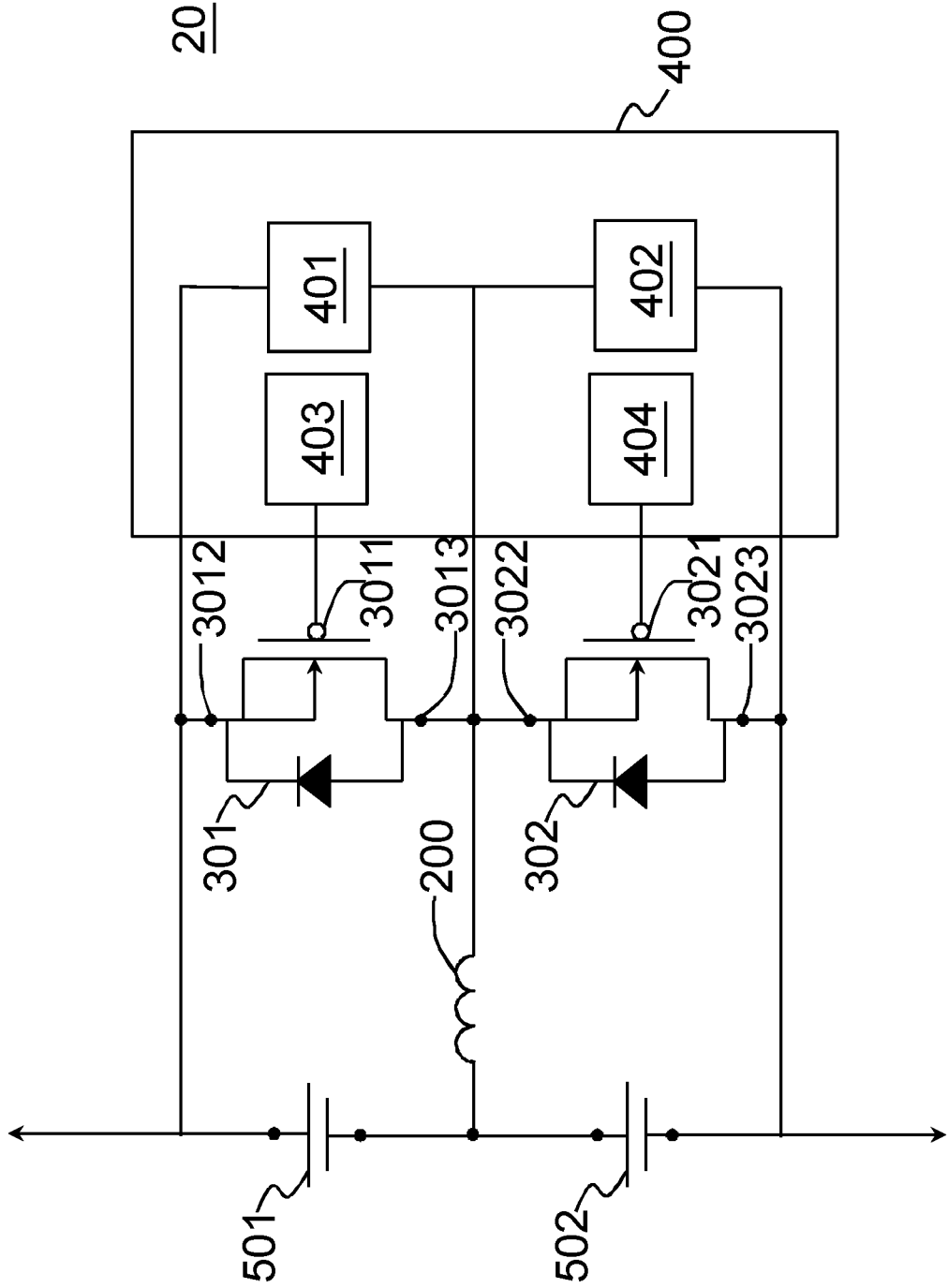
FIG. 5 illustrates the power transfer circuit comes back to original state.
Figure 6:
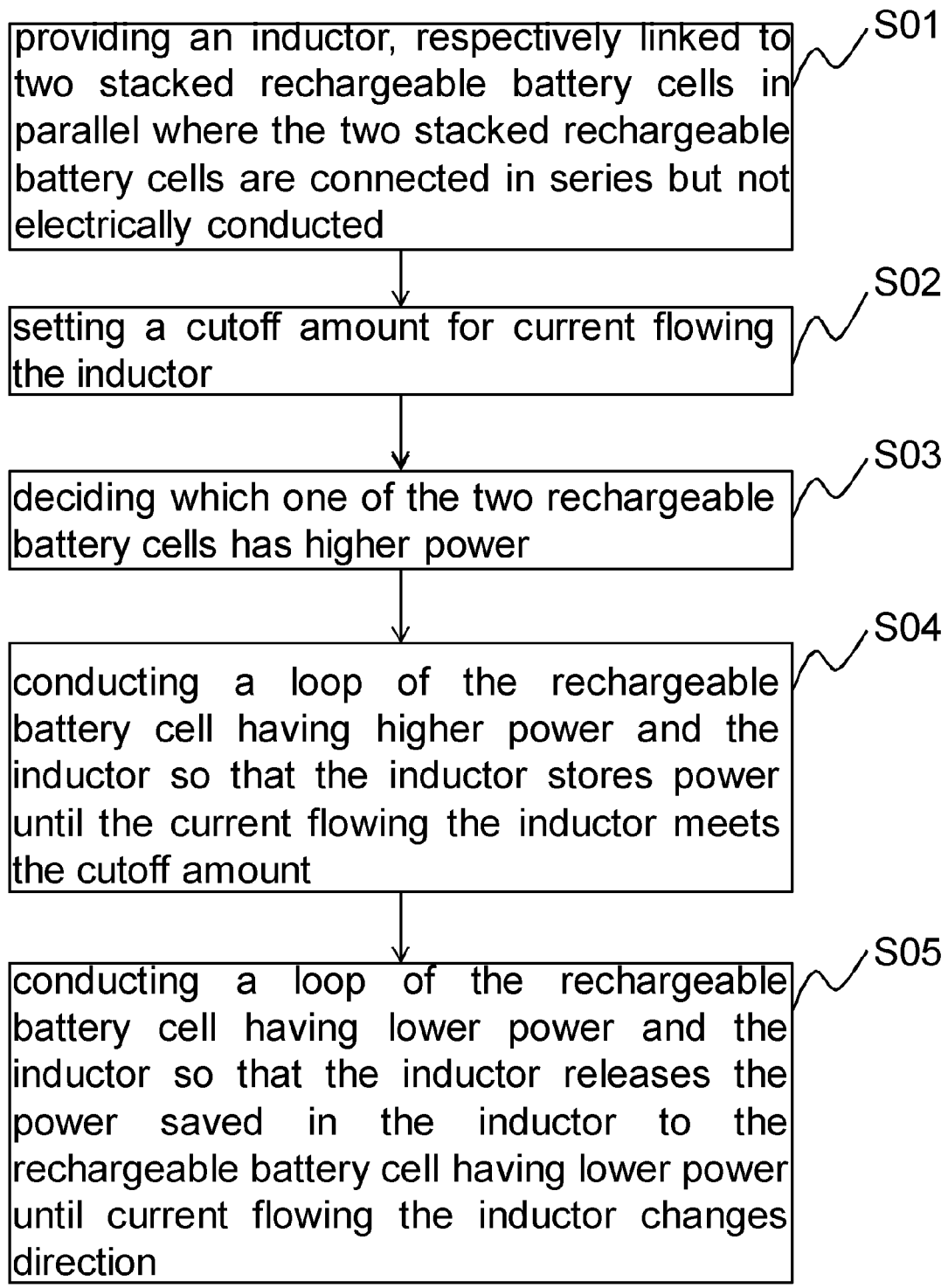
FIG. 6 is a flow chart of a control method for power transfer according to the present invention.
Figure 7:
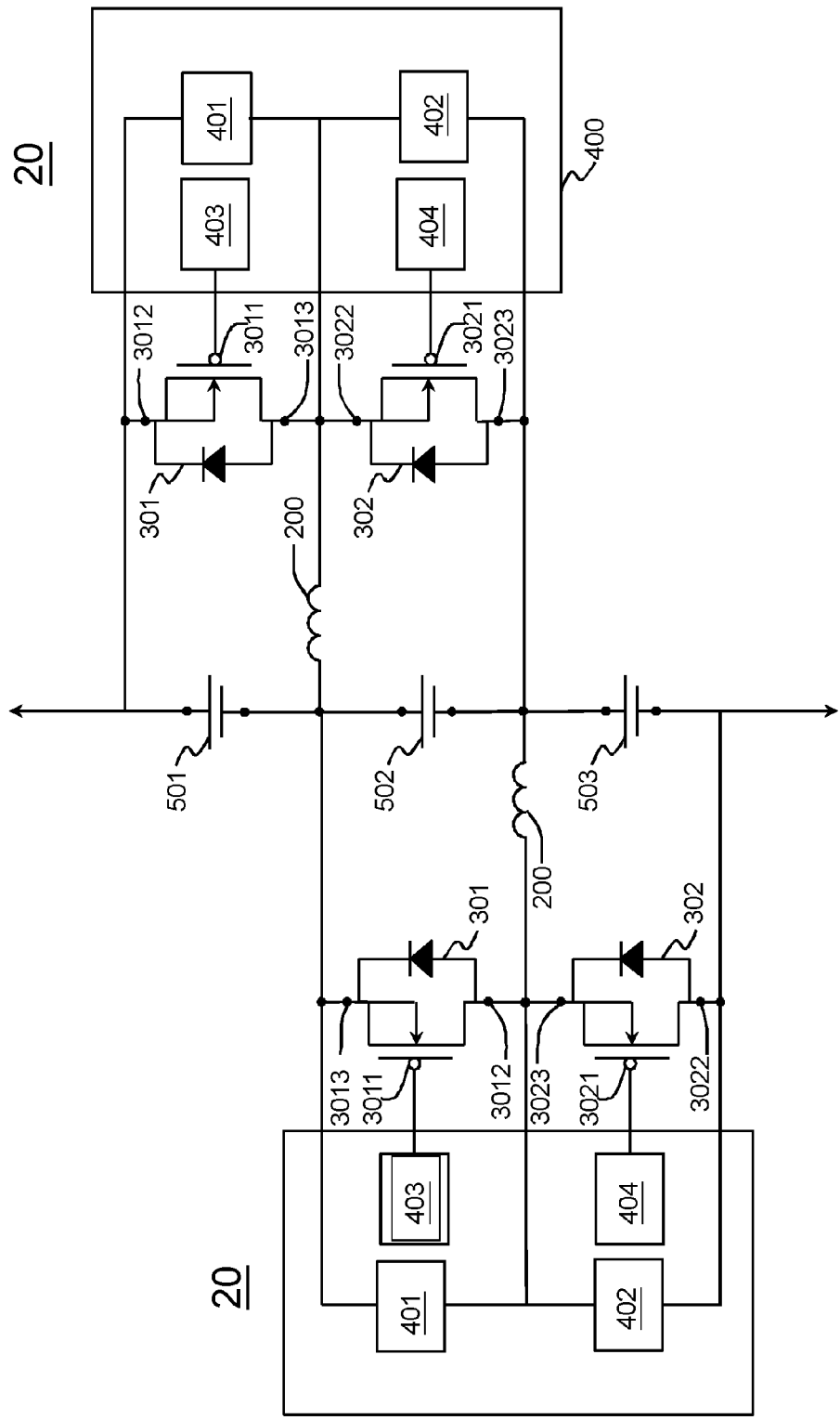
FIG. 7 illustrates several power transfer circuits operate in series.

Please refer to FIG. 2 to FIG. 7. FIG. 2 is a block diagram of a power transfer circuit according to the present invention. FIG. 3 illustrates an inductor in the power transfer circuit stores power. FIG. 4 illustrates the inductor in the power transfer circuit releases stored power. FIG. 5 illustrates the power transfer circuit comes back to original state. FIG. 6 is a flow chart of a control method for power transfer according to the present invention. FIG. 7 illustrates several power transfer circuits operate in series.

A power transfer circuit 20 for achieving power transfer between stacked rechargeable battery cells is composed of an inductor 200, a first switch 301, a second switch 302 and a controller 400. The inductor 200 is connected with a first rechargeable battery cell 501 and a second rechargeable battery cell 502 in parallel, respectively. Two loops are formed but not electrically conducted by control of the first switch 301 and the second switch 302. Functions of the inductor 200 are store and release power. The first rechargeable battery cell 501 and the second rechargeable battery cell 502 are linked in series and can provide partial power for a rechargeable battery set (not shown). A cathode of the first rechargeable battery cell 501 directly connects to an anode of the second rechargeable battery cell 502. A cathode of the second rechargeable battery cell 502 indirectly connects to an anode of the first rechargeable battery cell 501. A loop is formed. Here, "indirectly" means that the connection can include a load, such as a power supply component of an electric device, or a charger to form the loop. No matter the first rechargeable battery cell 501 and the second rechargeable battery cell 502 is under charge, discharge or idle condition, the power transfer circuit and control method for power transfer can be applied.

The first switch 301 is connected to the inductor 200 and the first rechargeable battery cell 501. It can conduct a loop links the inductor 200 and the first rechargeable battery cell 501 after a conducting signal is received. The second switch 302 and first switch 301 have the same structure. The second switch 302 is connected to the inductor 200 and the second rechargeable battery cell 502. It can also conduct a loop links the inductor 200 and the second rechargeable battery cell 502 after a conducting signal is received. The first switch 301 is composed of a diode and a P-channel Metal-Oxide-Semiconductor Field-Effect Transistor (MOSFET) linked in parallel. A gate 3011 of the P-channel MOSFET is turned on by the conducting signal. The conducting signal is a certain voltage. Similarly, the second switch 302 is also composed of a diode and a P-channel MOSFET linked in parallel. A gate 3021 of the MOSFET is turned on by the conducting signal. In practice, the P-channel MOSFET can also be replaced by an N-channel MOSFET, or the first switch 301 comprises a P-channel MOSFET and the second switch 302 comprises an N-channel MOSFET, and vice versa. For illustration in later paragraphs, in FIG. 2 to FIG. 5 and FIG. 7, a hollow circle of the gate 3011 of the first switch 301 and gate 3021 of the second switch 302 shows not-turning on while a solid circle shows turning on.

The controller 400 includes a first comparator 401, a second comparator 402, a first signal source 403 and a second signal source 404. The first comparator 401 is connected to a first end 3012 and a second end 3013 of the first switch 301. It is used to detect voltage difference across two ends of the first switch 301. The second comparator 402 is connected to a third end 3022 and a fourth end 3023 of the second switch 302. It is used to detect voltage difference across two ends of the second switch 302. The first signal source 403 sends the conducting signal to the gate 3011 of the first switch 301. The second signal source 404 sends the conducting signal to the gate 3021 of the second switch 302.

In order to illustrate operation of the power transfer circuit 20 (control method for power transfer), please refer to a flow chart in FIG. 6. The inductor 200 respectively linked to the first rechargeable battery cell 501 and second rechargeable battery cell 502 in parallel. The first rechargeable battery cell 501 and second rechargeable battery cell 502 are stacked and connected in series. However, since the first switch 301 and second switch 302 don't turn on, they are not electrically conducted. Two arrows from the rechargeable battery cells link to a heater (shown) and therefore form a loop for power supply (S01). As shown in FIG. 2, a status before it operates, the first rechargeable battery cell 501 and second rechargeable battery cell 502 are going to discharge. Before power transfer circuit 20 operates, a cutoff amount is set for the current flowing through the inductor 200 (S02). There is no specified way to determine the cutoff amount. It is only requested that when the cutoff amount comes out, power stored in the inductor 200 is still within its limit range. Meanwhile, measurement of cutoff amount can be obtained from dividing voltage difference across two ends of the switch by the resistance of the switch, or from other measuring devices. It is not limited to any specified way according to the present invention.

Since unbalance situation takes place between the first rechargeable battery cell 501 and the second rechargeable battery cell 502, it has to determine which one of the first rechargeable battery cell 501 and the second rechargeable battery cell 502 has higher power (S03). Many methods can be used to determine the power of a rechargeable battery cell. A preferable example is to measure state of charge. For rechargeable battery cells having the same specs, the one having higher state of charge has higher power. Many battery management systems for rechargeable battery cells can achieve the above object. The present invention doesn't limit the way to determine power of the rechargeable battery cell.

If the first rechargeable battery cell 501 has higher power, the first signal source 403 sends the conducting signal to the first switch 301 so that the first switch 301 turns on and the inductor 200 stored powers. Please refer to FIG. 3, a portion of the more power in the rechargeable battery cell 501 is transferred to the inductor 200 and stored via the first switch 301 (as the arrow shown). The conducting signal keeps being sent until the current flowing through the inductor 200 meets the cutoff amount (S04). Then, the second comparator 402 detects voltage difference between two ends of the second switch 302 and sends the conducting signal to the second switch 302 so that the second switch 302 turns on and the inductor 200 released the stored power to the second rechargeable battery cell 502 having lower power. Please refer to FIG. 4. As the arrow shown, The conducting signal keep being sent until the current flowing through the inductor 200 changes direction (please refer to FIG. 5; S05). Change of current flowing through the inductor 200 means the second rechargeable battery cell 502 absorbs the released power (charge) and starts to discharge. Therefore, direction of the direct current is different. Now, the voltage difference between two ends of the second switch 302 is also zero. It can be detected by the second comparator 402. On the contrary, when the second rechargeable battery cell 502 has higher power, the second switch 302 will turns on first. The inductor 200 will receive power from the second rechargeable battery cell 502 first, then transfer it to the first rechargeable battery cell 501. It should be noticed that power transfer may not be ready only with one operation. According to the present invention, it is acceptable to continuously switch on-and-off of the first switch 301 and the second switch 302 to achieve balance between rechargeable battery cells. Preferably, it is to set a minimum difference, for example 1%, for a difference between values of state of charge of the two rechargeable battery cells. When the difference between values of state of charge of the two rechargeable battery cells is smaller than the minimum difference, the first switch 301 and the second switch 302 both turns off. Hence, balance of the two rechargeable battery cells can be assumed to reach under an economical condition.

Last, the power transfer circuit in the present invention can interleavedly be set between rechargeable battery cells linked in series to achieve balance situation for all linked rechargeable battery cells. Please refer to FIG. 7. There is a third rechargeable battery cell 503 connected to the first rechargeable battery cell 501 and the second rechargeable battery cell 502 in series. Another power transfer circuit 20 is connected to the second rechargeable battery cell 502 and the third rechargeable battery cell 503. Two power transfer circuits 20 operate in the same way. The lower power transfer circuit 20 is used to balance the second rechargeable battery cell 502 and third rechargeable battery cell 503.

While the invention has been described in terms of what is presently considered to be the most practical and preferred embodiment, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A power transfer circuit for achieving power transfer between stacked rechargeable battery cells, comprising:

an inductor respectively linked to two stacked rechargeable battery cells in parallel but not electrically conducted where the two stacked rechargeable battery cells are connected in series, for storing power and releasing stored power, wherein an anode of one rechargeable battery cell is electrically connected to a cathode of the other rechargeable battery cell directly or indirectly so that a loop is formed;

a first switch, connected to the inductor and one of the two rechargeable battery cells, for conducting a loop linking of the inductor and the rechargeable battery cell connected thereto after receiving a conducting signal;

a second switch, connected to the inductor and the other of the two rechargeable battery cells, for conducting a loop linking of the inductor and the rechargeable battery cell connected thereto after receiving a conducting signal; and a controller, comprising:
 a first comparator, connected to a first end and a second end of the first switch, for detecting voltage difference across the first switch;
 a second comparator, connected to a third end and a fourth end of the second switch, for detecting voltage difference across the second switch;
 a first signal source for sending the conducting signal to the first switch;
 a second signal source for sending the conducting signal to the second switch, wherein a cutoff amount for current flowing through the inductor is preset, when the rechargeable battery cell connected to the first switch has higher power, the first signal source sends the conducting signal to the first switch so that the first switch turns on and the inductor stores power until the current flowing through the inductor meets the cutoff amount, and then the second comparator detects voltage difference between two ends of the second switch and sends the conducting signal to the second switch so that the second switch turns on and the inductor releases stored power to the rechargeable battery cell having lower power until direction of the current flowing through the inductor changes.

2. The power transfer circuit according to claim 1, wherein the rechargeable battery cell having higher state of charge has higher power.

3. The power transfer circuit according to claim 1, wherein when the current flowing through the inductor changes direction, voltage difference between two ends of the switch connected to the rechargeable battery having lower power is 0.

4. A power transfer circuit for achieving power transfer between stacked rechargeable battery cells, comprising:
- an inductor respectively linked to two stacked rechargeable battery cells in parallel but not electrically conducted where the two stacked rechargeable battery cells are connected in series, for storing power and releasing stored power, wherein an anode of one rechargeable battery cell is electrically connected to a cathode of the other rechargeable battery cell directly or indirectly so that a loop is formed;
- a first switch, connected to the inductor and one of the two rechargeable battery cells, for conducting a loop linking of the inductor and the rechargeable battery cell connected thereto after receiving a conducting signal;
- a second switch, connected to the inductor and the other of the two rechargeable battery cells, for conducting a loop linking of the inductor and the rechargeable battery cell connected thereto after receiving a conducting signal; and
- a controller, comprising:
  - a first comparator, connected to a first end and a second end of the first switch, for detecting voltage difference across the first switch;
  - a second comparator, connected to a third end and a fourth end of the second switch, for detecting voltage difference across the second switch;
  - a first signal source for sending the conducting signal to the first switch;
  - a second signal source for sending the conducting signal to the second switch,
- wherein a cutoff amount for current flowing through the inductor is preset, when the rechargeable battery cell connected to the second switch has higher power, the second signal source sends the conducting signal to the second switch so that the second switch turns on and the inductor stores power until the current flowing through the inductor meets the cutoff amount, and then the first comparator detects voltage difference between two ends of the first switch and sends the conducting signal to the first switch so that the first switch turns on and the inductor releases stored power to the rechargeable battery cell having lower power until direction of the current flowing through the inductor changes.

5. The power transfer circuit according to claim 4, wherein the rechargeable battery cell having higher state of charge has higher power.

6. The power transfer circuit according to claim 4, wherein when the current flowing through the inductor changes direction, voltage difference between two ends of the switch connected to the rechargeable battery having lower power is 0.

7. The power transfer circuit according to claim 1, wherein the first switch is an N-channel Metal-Oxide-Semiconductor Field-Effect Transistor (MOSFET) or a P-channel MOSFET.

8. The power transfer circuit according to claim 1, wherein the second switch an N-channel MOSFET or a P-channel MOSFET.

9. The power transfer circuit according to claim 1, wherein when a difference between values of state of charge of the two rechargeable battery cells is smaller than a minimum difference, the first switch and the second switch both turns off.

10. The power transfer circuit according to claim 4, wherein the first switch is an N-channel Metal-Oxide-Semiconductor Field-Effect Transistor (MOSFET) or a P-channel MOSFET.

11. The power transfer circuit according to claim 4, wherein the second switch an N-channel MOSFET or a P-channel MOSFET.

12. The power transfer circuit according to claim 4, wherein when a difference between values of state of charge of the two rechargeable battery cells is smaller than a minimum difference, the first switch and the second switch both turns off.

\* \* \* \* \*